United States Patent Office 3,505,357
Patented Apr. 7, 1970

3,505,357
TETRAHYDROPYRANYL PEROXIDES OF DDD AND ITS ANALOGUES
Douglas J. Hennessey, 47 Greyson Place,
Teaneck, N.J. 07666
No Drawing. Filed May 16, 1967, Ser. No. 638,718
Int. Cl. C07d 7/04
U.S. Cl. 260—345.9        7 Claims

ABSTRACT OF THE DISCLOSURE

Insecticidal 2'-tetrahydropyranyl peroxide derivatives of 1,1-bis-(p-chlorophenyl)-2,2-dichloroethane and its analogues.

---

This invention relates to compounds which are tetrahydropyranyl peroxide derivatives of certain analogues of DDT, particularly 1,1-bis-(chlorophenyl)-2,2-dichloroethane (commonly known as DDD or TDE), which derivatives have useful insecticidal properties. The invention also relates to methods for the preparation of these compounds, to compositions containing these compounds, and to method for killing insects using these compounds and compositions.

In the years immediately following the discovery of the insecticidal properties of DDT, intensive research was undertaken to develop related compounds which would have equal or greater effectiveness against unwanted insects and, at the same time, would be less toxic to mammals. Among the compounds discovered was 1,1-bis(p-chlyorophenyl-2,2-dichloroethane,

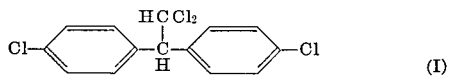

(I)

later to become familiarly known as DDD or TDE. With the continuous use of DDT, DDD and other similar analogues, it was soon found, however, that strains of insects developed which were resistant to these insecticides. This, in turn, led to the development of additional DDT-analogues and to intensive research into the toxic mechanism of these compounds.

I have discovered that oxidation of DDD and analogous compounds in the presence of bromine atoms yields a new class of hydroperoxide compounds having the following general structure.

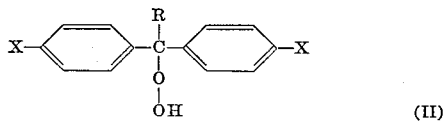

(II)

in which X represents fluorine, chlorine, bromine, or hydrogen and R represents dihalomethyl whose halogen atoms are selected from fluorine, chlorine and bromine, trifluoromethyl or carb(lower)alkoxy. Detailed information concerning these hydroperoxides, their preparation and use may be found in my copending application Ser. No. 638,730, filed concurrently herewith.

I have now discovered that hydroperoxide compounds of Formula II can be reacted with dihydropyran in the presence of an acid to yield a new class of tetrahydropyranyl peroxide compounds having the following general structure

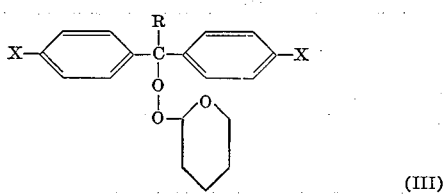

(III)

in which X and R have the meanings ascribed to them in Formula II. The X and R substituents will, of course, be determined by the choice of starting compound.

The term "lower alkoxy" as used herein refers to saturated oxy-radicals having from 1 to 6 carbon atoms, including, for example, methoxy, ethoxy, n-propoxy, isopropoxy, tert-butoxy, n-amyloxy, etc.

Specifically, this reaction in the case of 1,1-bis-(p-chlorophenyl)-2,2-dichloroethyl hydroperoxide ("DDD hydroperoxide") proceeds according to the following scheme to yield 2'-tetrahydropyranyl-1,1-bis(p-chlorophenyl)-2,2-dichloroethyl peroxide:

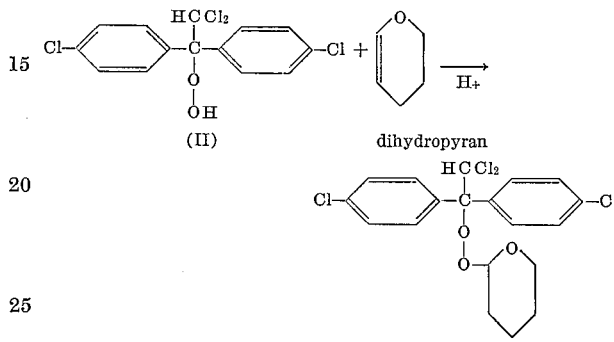

The starting compounds for reactions of this type can be the crystallized hydroperoxides obtained by bromine catalyzed autoxidation of DDD or its analogues. Alternatively the oily product produced by the autoxidation reaction, which typically can contain up to about 80% of the hydroperoxide, can be used unpurified as the starting product for this reaction.

Solvents for this reaction include all those in which the reactants and products are inert. Conveniently, carbon tetrachloride, hexachlorobutadiene, or 1,1,2-trichloro-1,2,2-trifluoroethane may be used. Alternatively, other solvents, such as ether, may be used. The amount of dihydropran used can vary considerably, but, as a minimum, there should be one mole of dihydropyran for each mole of hydroperoxide. It has been found that satisfactory results are obtained when there are present three moles of dihydropyran for each mole of hydroperoxide. Similarly, the reaction temperature is not critical although, of course, the temperature chosen should be one which is below the boiling point of the solvent. With solvents such as carbon tetrachloride and ether, the reaction may be run at room temperature. The acid catalyst may conveniently be a dilute solution of hydrobromic or hydrochloric acid, or may be gaseous HCl.

Further details on the preparation of these tetrahydropyranyl peroxides are contained in the following examples, which are here included merely for purposes of illustration.

EXAMPLE 1

2'-tetrahydropyranyl-1,1-bis-(p-chlorophenyl)-2,2-dichloroethyl peroxide 1,1-bis(p-chlorophenyl)-2,2-dichloroethyl hydroperoxide, obtained as the crude oily product from the bromine catalyst oxidation of 10 grams of DDD (0.0312 mol) and 2.63 grams (0.0313 mole) of dihydropyran were dissolved in 30 ml. of carbon tetrachloride. One and one-half ml. of 0.38 M hydrogen bromide solution in carbon tetrachloride was added. After one hour, the solvent was stripped under reduced pressure and the residue was redissolved in 20 ml. of hexane. After a week at −10°, 8.5 grams of the product was obtained; melting point 108–109°. The fingerprint region of its infrared spectrum displayed bands characteristic of tetrahydropyranyl derivatives at 8.32, 8.44, 11.09 and 11.38μ.

*Analysis.*—Calc. for $C_{19}H_{18}Cl_4O_3$ (percent): C, 52.34; H, 4.13. Found (percent): C, 52.66; H, 4.13.

EXAMPLE 2

2′-tetrahydropyranyl-1,1-diphenyl-2,2-dichloroethyl peroxide 1 gram (0.0035 mole) of 1,1-diphenyl-2,2-dichloroethyl hydroperoxide and 1 ml. (0.011 mole) of dihydropyran were dissolved in 5 ml. of ether. Hydrogen chloride gas was bubbled into the solution until the reaction vessel warmed up about 5°. After an hour at room temperature, the solution was stripped first under water aspirator pressure, then under high vacuum to remove excess dihydropyran. About 500 mg. of the resultant oil was thin-layer chromatographed on a millimeter thick silica gel G plate with benzene as solvent. 310 mg. of oil was obtained, $R_f$ 0.4. A first crop of 150 mg. of the product was obtained, with melting point 65–68°. A second crop of 55 mg., with melting point 69–72°, crystallized out of pentane. After two recrystallizations the product had a melting point of 71–72°. The fingerprint region of its infrared spectrum displayed bands characteristic of tetrahydropyranyl derivatives at 8.32, 8.44, 11.07 and 11.40μ.

*Analysis.*—Calc. for $C_{19}H_{20}Cl_2O_3$ (percent): C, 62.14; H, 5.45; Cl, 19.35. Found (percent): C, 63.11; H, 5.50; Cl, 19.21.

EXAMPLE 3

2′-tetrahydropyranyl-1,1-bis(p-fluorophenyl)-2,2-dichloroethyl peroxide

Using the procedure of Example 2, this product was prepared from 0.9 gram (0.0028 mole) of 1,1-bis(p-fluorophenyl)-2,2-dichloroethyl hydroperoxide. 0.5 gram of the resultant oily product was thin-layer chromatographed on a 0.5 mm. silica gel G plate with benzene as the solvent. The compound had an $R_f$ value of 0.4. About 0.3 gram of oil was obtained and 3 recrystallizations from pentane yielded 105 mg. of white crystals, with a melting point of 65–66°. Its infrared spectrum displayed bands characteristic of tetrahydropyranyl derivatives at 8.32, 8.44, 11.11 and 11.43μ.

*Analysis.*—Calc. for $C_{19}H_{18}Cl_2F_2O_3$ (percent): C, 56.58; H, 4.47. Found (percent): C, 56.86; H, 4.68.

EXAMPLE 4

2′-tetrahydropyranyl-1,1-bis(p-bromophenyl)-2,2-dichloroethyl peroxide

Following the procedure of Example 2, the product was prepared from 2.2 gram (0.005 mole) of 1,1-bis(p-bromophenyl)-2,2-dichloroethyl hydroperoxide. The resultant oily product was crystallized from pentane yielding a product with melting point 85–89°. Recrystallization from 15 ml. of pentane gave 1.0 gram of white crystals having a melting point of 89–91°. On recrystallization three additional times, the sample attained a melting point of 90.5–92°. Its infrared spectrum showed absorption bands characteristic of tetrahydropyranyl derivatives at 8.32, 8.45, 11.15 and 11.45μ.

*Analysis.*—Calc. for $C_{19}H_{18}Br_2Cl_2O_3$ (percent): C, 43.45; H, 3.43. Found (percent): C, 43.66; H, 3.43.

EXAMPLE 5

2′-tetrahydropyranyl-1,1-bis(p-chlorophenyl)-2,2-dibromoethyl peroxide

Following the procedure of Example 2, the product was prepared from 4.5 grams (0.0085 mole) of 1,1-bis(p-chlorophenyl)-2,2-dibromoethyl hydroperoxide. The resultant oil was recrystallized out of pentane being seeded with crystals obtained from thin-layer chromatography of 0.5 gram on a 0.5 mm. thick silica gel G plate with benzene as solvent. The crystallizing yield was 3.2 grams, melting point 100–101°. An analytical sample was prepared by repeated recrystallization from pentane, the sample having a melting point of 103–104°. Its infrared spectrum displayed bands characteristic of tetrahydropyranyl derivatives at 8.32, 8.46, 11.13, and 11.45μ.

*Analysis.*—Calc. for $C_{19}H_{18}Br_2Cl_2O_3$ (percent): C, 43.45; H, 3.43. Found (percent): C, 43.61; H, 3.62.

EXAMPLE 6

2′-tetrahydropyranyl-1,1-bis(p-chlorophenyl)-2,1-bromo-2-chloroethyl peroxide

The starting product, 1,1-bis(p-chlorophenyl)-2-bromo-2-chloroethyl hydroperoxide, was obtained in its crude oily state from the autoxidation of 1,1-bis(p-chlorophenyl)-2-bromo-2-chloroethane. The starting product was then reacted with dihydropyran according to the method of Example 2. A first crop of 2.0 grams of product was obtained, with melting point 99–102°. This was recrystallized from 2 ml. of methylene chloride and 25 ml. of pentane to give 1.1 grams of product, melting point 106–108°. Its infrared spectrum displayed absorption bands characteristic of tetrahydropyranyl derivatives at 8.32, 8.46, 11.14 and 11.46μ.

*Analysis.*—Calc. for $C_{19}H_{16}BrCl_3O_3$ (percent): C, 47.47; H, 3.74; Br, 16.65; Cl, 22.16. Found (percent): C, 47.88; H, 3.65; Br, 16.71; Cl, 22.24.

The tetrahydropyranyl compounds of this invention are useful as insecticides. The invention therefore also encompasses a method of combatting insects by applying to the insects or to loci infested by said insects an insecticidally effective amount of these tetrahydropyranyl compounds. Compositions containing these compounds may be prepared by methods analogous to the preparation of compositions containing DDT or DDD. They may be in the form of sprays, liquids, etc.

EXAMPLE 7

The insecticidal activity of various compounds having the structure of Formula III was investigated on three species of mosquito larvae. The data are set forth in the following table.

TABLE

| | Mosquito Larvae | | | |
|---|---|---|---|---|
| | C. Tarsalis | | | |
| | Susceptible to DDT | Resistant to DDT | C. Quinquefasciatus | A. Albanus |
| Compound | $LC_{50}$ p.p.w. | $LC_{50}$ p.p.m.w. | $TC_{50}$, p.p.m.w. | $LC_{50}$, p.p.m.w. |
| 2′-tetrahydropyranyl-1,1-bis(p-chlorophenyl)-2,2-dichloroethyl peroxide (Example 1) | 0.2 | 0.4 | ~0.5 | ~0.1 |
| 2′-tetrahydropyranyl-1,1-bis (p-fluorophenyl)-2,2-dichloroethyl peroxide (Example 3) | 6 | >10 | | |
| 2′-tetrahydropyranyl-1,1-bis(p-bromophenyl)-2,2-dichloroethyl peroxide (Example 4) | 0.6 | >10 | | |
| 2′-tetrahydropyranyl-1,1-bis-(p-chlorophenyl)-2,2-dibromoethyl peroxide (Example 5) | | | 1 | 1 |
| 2′-tetrahydropyranyl-1,4-bis(p-chlorophenyl)-2-bromo-2-chloroethyl peroxide (Example 6) | 0.8 | 6 | | |

It can thus be seen that these tetrahydropyranyl compounds possess insecticidal activity and show promise as effective insecticides against some DDT resistant species.

I claim:

1. A compound of the formula:

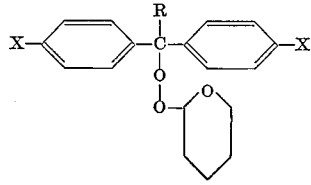

wherein

X is hydrogen, fluorine, chlorine or bromine; and
R is dihalomethyl whose halogen atoms are selected from chlorine and bromine;

2. A compound according to claim 1 in which X is chlorine or bromine.

3. A compound according to claim 2 which is 2'-tetrahydropyranyl - 1,1 - bis(p-chlorophenyl)-2,2-dichloroethyl peroxide.

4. A compound according to claim 2 which is 2'-tetrahydropyranyl -1,1 - bis(p-fluorophenyl) - 2,2 - dichloroethyl peroxide.

5. A compound according to claim 2 which is 2'-tetrahydropyranyl - 1,1 - bis(p-bromophenyl)-2,2 - dichloroethyl peroxide.

6. A compound according to claim 2 which is 2'-tetrahydropyranyl - 1,1 - bis(p-chlorophenyl) - 2,2 - dibromoethyl peroxide.

7. A compound according to claim 2 which is 2'-tetrahydropyranyl - 1,1 - bis(p-chlorophenyl) - 2 - bromo - 2 - chloroethyl peroxide.

References Cited

UNITED STATES PATENTS 3,030,386   4/1962   Weissermel _____ 260—345.9

NORMA S. MILESTONE, Primary Examiner

U.S. Cl. X.R.

260—283, 610